United States Patent
Szczerba

(10) Patent No.: US 6,175,804 B1
(45) Date of Patent: Jan. 16, 2001

(54) COMPUTATION OF ROUTES FOR BOUNDING OVERWATCH OPERATIONS

(75) Inventor: Robert Joseph Szczerba, Endicott, NY (US)

(73) Assignee: Lockheed Martin Corp., Owego, NY (US)

( * ) Notice: Under 35 U.S.C. 154(b), the term of this patent shall be extended for 0 days.

(21) Appl. No.: 09/266,624

(22) Filed: Mar. 11, 1999

(51) Int. Cl.$^7$ .......................... G01C 21/00; G06F 165/00
(52) U.S. Cl. ...................... 701/209; 701/200; 701/201
(58) Field of Search ................................ 701/200, 202, 701/209, 201; 73/178 R; 434/11; 342/13, 357.08, 357.17

(56) References Cited

U.S. PATENT DOCUMENTS

| | | | |
|---|---|---|---|
| 5,170,353 | 12/1992 | Verstraete | 364/444 |
| 5,187,667 | 2/1993 | Short | 364/443 |
| 5,475,598 | 12/1995 | Fushimi et al. | 364/444 |
| 5,521,826 | 5/1996 | Matsumoto | 364/449 |
| 5,559,520 | 9/1996 | Barzegar et al. | 342/357 |
| 5,712,788 | 1/1998 | Liaw et al. | 364/449 |
| 5,798,733 | * 8/1998 | Etheridge | 701/209 |

* cited by examiner

Primary Examiner—Ian J. Lobo
(74) Attorney, Agent, or Firm—W. H. Meise; R. P. Cogan

(57) ABSTRACT

A processor-based system performs overwatch location and routing determinations for plural independent entities acting as a team. The system accepts data representing a "map" and uses that portion including the objective location or direction, together with data about known features of the environment and the capabilities of the team entities. An initial coarse route is inputted. The data is processed by designation of one of the team members as the overwatcher, and the other as the bounder. The procedure includes the steps of determination of an area to which bounding is permitted, and pruning out those grid cells in that area which cannot be seen from the first overview location. For the remaining grid cells of the pruned set, a cost function is determined for each remaining grid location. The cost function takes into account the minimum cost to reach the cell under consideration from the current bounding entity location, together with a function which relates to how many other grid cells can be seen from the cell under consideration. When all relevant cells have been evaluated, the cell having the minimum value of the cost function is deemed to be the next overwatch location, and therefore the terminus of the first bounding operation.

2 Claims, 8 Drawing Sheets

Fig. 6a

Current Position of Bounding Vehicle → 5

Potential New Overwatch Positions

|   | 1 | 2 | 3 | 4 | 5 |
|---|---|---|---|---|---|
| A | 12 / 50 | 10 / 38 | 16 / 28 | 12 / 12 | 14 / 0 |
| B | 84 / 122 | 272 / 300 | 275 / 287 | 15 / 15 | 15 / 15 |
| C | 236 / 358 | 45 / 167 | 210 / 225 | 13 / 28 | 13 / 28 |
| D | 32 / 199 | 236 / 403 | 299 / 327 | 222 / 250 | 214 / 242 |
| E | 23 / 222 | 23 / 222 | 25 / 247 | 34 / 276 | 24 / 266 |

MC Value / BC Value

*Fig. 6b*

|   | 1 | 2 | 3 | 4 | 5 |
|---|---|---|---|---|---|
| A | 12 / 50 | 10 / 38 | 16 / 28 | 12 / 12 | 14 / 0 |
| B | 84 / 122 | 272 / 300 | 275 / 287 | 15 / 15 | 15 / 15 |
| C | 236 / 358 | 45 / 167 | 210 / 225 | 13 / 28 | 13 / 28 |
| D | 32 / 199 | 236 / 403 | 299 / 327 | 222 / 250 | 214 / 242 |
| E | 23 / 222 | 23 / 222 | 25 / 247 | 34 / 276 | 24 / 266 |

← New Overwatch Position

MC Value
BC Value

COMPUTATION OF ROUTES FOR BOUNDING OVERWATCH OPERATIONS

FIELD OF THE INVENTION

This invention relates to the use of computers for performing at least a part of tasks currently performed by humans, and more particularly to the computation or determination of routes for the members of a team which alternate bounding and overwatch operations.

BACKGROUND OF THE INVENTION

The coordination of vehicle teams on the ground, in the air, or on water, is an important problem for a variety of military and quasi-military applications. One of the more important of these functions is that of bounding overwatch operations. Such bounding overwatch operations occur when an entity (which may be a multi-vehicle entity) moves under the observation and protection afforded by a second entity. The benefit of movement under the protection of an overwatch entity which is stationed at a fixed location is that a stationary overwatch entity can usually be so situated that it can better watch for danger and engage an enemy than the moving entity can. Most bounding overwatch operations involve the alternating movement of team members from one fixed waypoint location to another, in the general direction of the location of the objective. More particularly, one team member moves or bounds from his (or its) location to the next overwatch location, while the other team member remains on watch at the first overwatch location. When the bounding team member arrives at his next overwatch location, he becomes the overwatch team member, and the team member at the first overwatch location then moves toward the third overwatch location.

The determination of overlook locations and the routes from the present locations of the entities is a difficult problem in bounding overwatch operations. In general, the problem can be divided into two parts, one of which is the determination of the location of overwatch location, and the other of which is determination of the most efficient path from the present location of the bounding entity to the next overwatch location. In this context, the term "efficiency" or "accuracy" is used broadly, to include such matters as the relative difficulty of the various possible alternate routes, the relative danger anticipated for each of the routes, the amount of concealment available to the bounding vehicle during traversal of the route, and any other relevant considerations. The selection of the overwatch location from which the overwatching vehicle will protect the bounding vehicle is subject to mutually inconsistent considerations; an exposed, high vantage point provides a good view of the surrounding area, but being exposed, becomes observable to an enemy, and may provide little concealment.

Most bounding overwatch problems are currently solved by manual methods. The manual methods are time-consuming and subject to error. As the battlefield becomes more complex, the time consumed by manual determinations, and the possibility of error, especially that attributable to haste, may not be acceptable.

Improved bounding overwatch location determination techniques are desired.

SUMMARY OF THE INVENTION

A computer method determines the routes of at least first and second entities, which operate as a team, or as at least part of a team, toward an objective location in a threat environment. The threat environment has topological features which aid in concealment and in providing vantage points for observation. The method includes the step of obtaining a data representation of the environment in a region which includes the present locations of the first and second entities, and which also includes a particular objective location in the environment. The data representation should include any known threats lying within the environment. A coarse route is selected through the environment, as by a human operator, The data representing the coarse route is read. Data relating to some characteristics of the first and second entities is obtained. This data may include such matters as the types of communication devices and weapons with which each entity is fitted, which are surrogates for the information which is actually required, which includes the range and other characteristics of the communication system, the nature of the entity forces which can be expected to be in the area, and the range and accuracy of their various weapons. According to an aspect of the invention, one of the first and second entities is designated to be the bounding entity, and the other one of the first and second entities to be the overwatching entity. The computer program determines the next overwatch location, and determines the route which the bounding entity should take to the next overwatch location. Movement of the bounding entity toward the next overwatch location is then commanded or suggested. If the overwatch location is not the location of the objective, the other one of the first and second entities is redesignated to be the bounding entity and the one of the first and second entities to be the overwatching entity. The procedure is partially repeated until the objective is reached or the objective is changed, by repeating the steps of determining the next overwatch location, determining the route, commanding the movement, and redesignating.

BRIEF DESCRIPTION OF THE DRAWING

FIG. 6a is a table which represents Defense Mapping Agency Digital Terrain Mapping Data, or a digital map broken down into rectangular cells or elements, and FIG. 6b is similar to FIG. 6a, but has the cells associated with a particular path selection circled for identification.

DESCRIPTION OF THE INVENTION

In the context of this invention, the environment is represented by a 'map' divided into an n×m grid of square cells of equal size. Each cell represents a particular area in the environment. Each cell is associated with an intervisibility (IV) value, which is a numerical representation of the area of the battlefield or environment which is visible from the area associated with the grid square or element. The IV value is determined by any one of a number of extant methods, as for example a document prepared by U.S. Army TRADOC Analysis Center—White Sands Missile Range,

*The Effects of Different Line of Sight Algorithms and Terrain Elevation Representations on Combat Simulations,* September 1995. In general, the higher the IV value of a grid element, the greater the area which can be seen from the corresponding location in the environment, and the greater the area from which one can be seen. The area which can be "seen" from a given grid element depends upon the type(s) of sensors which are available to an entity "located" at the grid element, and environmental factors, such as the presence or absence of mountains or valleys adjacent the grid element. The data for the square grid cells or elements may be derived from Defense Mapping Agency Digital Terrain Elevation Data (DMA DTED). The data or information from DMA DTED may be combined with digital feature analysis data (DFAD) representing terrain features, such as roads, towns, and the like, to generate a composite map including as much relevant information as may be available.

Figure 1:
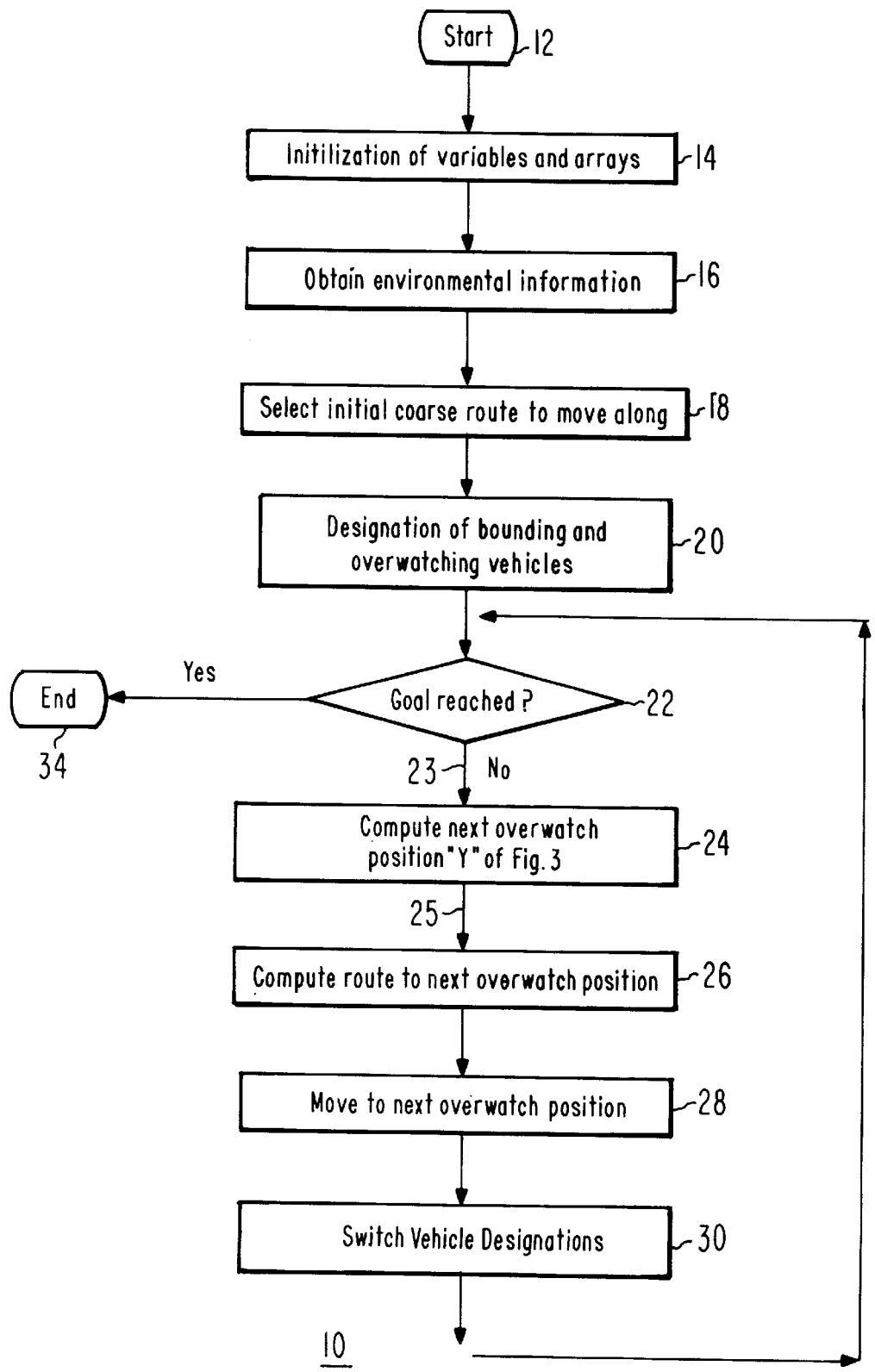
FIG. 1 is a simplified flow chart or diagram illustrating the overall computer according to an aspect of the invention.

FIG. 1 is a simplified flow chart illustrating bounding overwatch calculations or determinations according to an aspect of the invention. In FIG. 1, the logic flows from a START block 12 and flows to a block 14, which represents initialization of variables and loading of arrays of information. The variables may include such matters as the characteristics of the sensors and the range of weapons of the two entities which comprise the team. From block 14, the logic flows to a block 16, which represents the obtaining of environmental information. This environmental information is in the form of DMA DTED data enriched with DFAD data and any other relevant data, including that which may be available from moment to moment from the occupants of a vehicle associated with the entities, which may be entered via keyboard or mouse. From block 16, the logic flows to a further block 18, which represents reading of an initial coarse route between the location of the objective and the present location(s) of the two entities in the team. This step is expected to be performed by hand, and should not unduly delay generation of the desired routing and waypoint overlook locations.

Once the initial coarse route is read in block 18 of FIG. 1, the logic flows to a block 20, which represents designation of one of the entities or vehicles as being the bounding vehicle, and the other entity or vehicle is by default the overwatching vehicle. If the two entities of the team are initially at the same location, and are fitted with the same type of equipment, this selection may be as simple as an arbitrary selection, such as by generation of a random number, and assigning the entity with the lower serial number to be the bounding entity if the random number is even, and to be the overwatch entity if the random number is odd. If the entities are initially at different locations, the determination may be made on the basis of which vehicle incurs less risk during bounding.

From block 20 of FIG. 1, the logic flows to a decision block 22, which determines if the goal (attainment of the objective) has been reached. If not, the logic leaves decision block 22 by the NO output path, and arrives at a block 24, which represents determination of the next overwatch location or position. The next overwatch position may of course be the first overwatch position to be determined by the system or method 10, if the current pass through the logic is the first path. Details of the method of determination block 24 are provided in conjunction with the flow chart of FIG. 2, below. From block 24, the logic flows to a further block 26, which determines the route from the present position of the selected bounding entity to the first calculated overwatch location. Details of the operation of block 26 are described below in conjunction with FIGS. 6a and 6b, and are described in U.S. patent application Ser. No. 09/118,838 filed Jul. 20, 1998 in the name of Szczerba [FE-00231].

When the route to be taken by the bounding entity is determined in block 26 of FIG. 1, the logic flows to a block 28, which represents transmission of the data, if necessary, to the entities, or at least to the bounding entity, and suggestion or command to begin the bounding overwatch operation. In response to the route data and to the command, the bounding entity proceeds along the route to the first waystation, which is the first of the overwatch locations which was determined in block 24. When the bounding entity reaches the first waystation or overwatch location, or when commanded to proceed, the logic of FIG. 1 flows to block 30, which represents switching the bounding/overwatch characteristics of the two entities. Thus, the entity which bounded from the initial location to the first waystation or overwatch location becomes the overwatch entity, and the entity which was previously the overwatch entity becomes the bounding entity. This operation may be very simple in terms of computing operations, involving merely the switching of a binary flag associated with one of the entities.

From block 30, the logic of FIG. 1 flows by way of a logic path 32 back to the input of decision block 22. Block 22 determines if the objective has been reached by comparing the objective with the last-computed waypoint or overwatch location. If they are identical, the objective has been reached, and decision block 22 routes the logic by way of its YES output to an END block 34. If they are not identical, then another iteration is performed.

Figure 2:
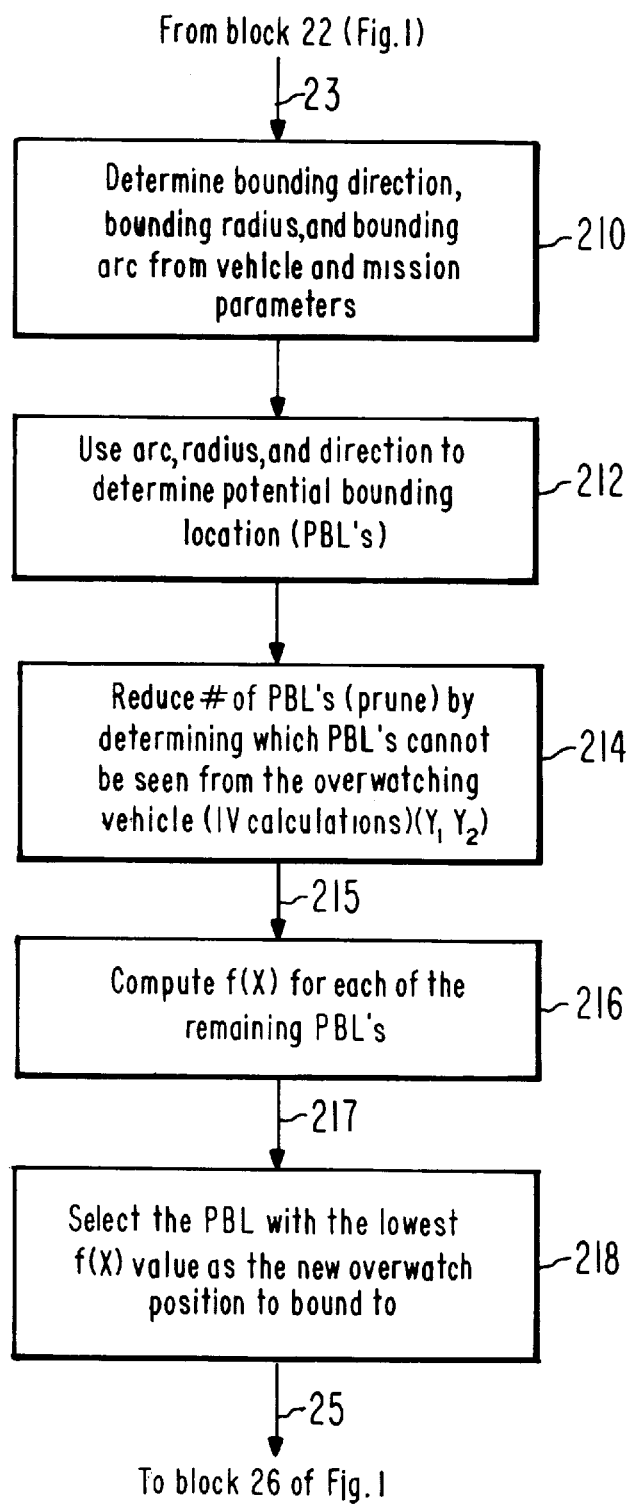
FIG. 2 is a simplified flow chart or diagram illustrating details of a portion of the processing of FIG. 1.
Figure 3:
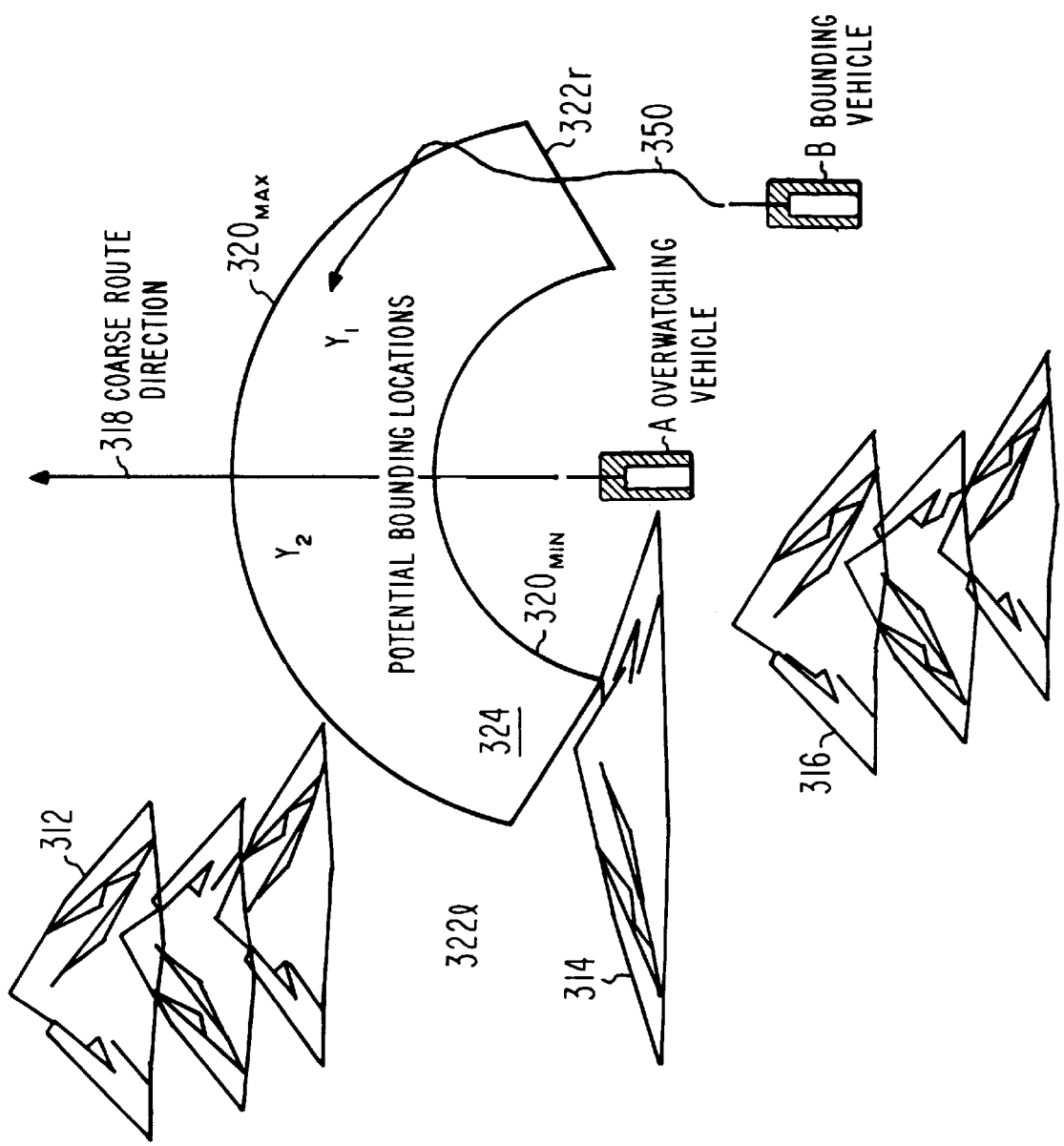
FIG. 3 is a simplified map illustrating an aspect of the processing of FIG. 2.

FIG. 2 represents details of the operations associated with block 24 of FIG. 1. In FIG. 2, the logic arrives at a block 210. Block 210 represents determination of various bounding parameters associated with the next bound of the bounding entity. More particularly, the parameters include bounding direction, bounding radius, and bounding arc or sector. FIG. 3 is a simplified representation of a "map" 310 illustrating hills or mountain ranges designated as 312, 314, and 316, and also illustrating locations A and B of the current overwatch and bounding entities or vehicles, respectively. In FIG. 3, the bounding or route direction is indicated by an arrow 318, and the minimum and maximum bounding radii are illustrated as $320_{MIN}$ and $320_{MAX}$. The minimum bounding radius $320_{MIN}$ is determined by the minimum distance which results in efficient movement, as for example by eliminating movements of a few yards in a context in which hundreds or thousands of yards is more appropriate. The maximum bounding distance $320_{MAX}$ is established by considerations including the maximum range of communications between the current overwatch entity, and possibly by the maximum effective range of its weapons (although, since the overwatch vehicle would not be firing at its teammate, the maximum radius must put the bounding vehicle well within that range, so an enemy force attacking the bounding member of the team could be engaged by the overwatch entity). The two arcs $320_{MIN}$ and $320_{MAX}$, together with two bounding "sides" 322*l* and 322*r* joining arcs $320_{MIN}$ and $320_{MAX}$, define a sector or area designated 324, which contains all grid elements which might possibly be usable as potential bounding terminal locations (PBLs).

In FIG. 2, the logic flows from block 210 to a block 212, which represents determination of all potential bounding location (PBL) termini of the next bounding step. More particularly, these potential locations correspond with all possible locations within the area 324 of FIG. 3. In effect, the set is selected of all possible grid locations within the bounded area. From block 212, the logic flows to a block 214, which represents pruning of the set of all PBLs within the bounds of area 324, by determining which ones of the PBL termini cannot be seen from the present location of the overwatch entity. This will, in the simplest case, depend simply on line-of-sight considerations, which are determinable directly from the previously obtained IV information associated with each cell of the "map". More particularly, all of the cells of the grid are assigned a binary number, namely a 1 or a 0, to the cell, 1 if it can be seen from cell Y, and 0 if it cannot. All cells having an IV value of 0 are eliminated, to thereby leave a set of pruned grid cells. In FIG. 3, the pruned set is illustrated as containing only two cells or members, which are designated $Y_1$ and $Y_2$. The cells which are removed from consideration by the pruning process are not further considered during the current set of computations. From block 214, the logic flows by way of a logic path 215 to a block 216, which represents computation of f(x) for each of the remaining grid cells or pruned cell locations (pruned PBLs). In general, the arrangement of block 216 computes a value for each cell according to a cost function $$f(x)=a(g(x))+b((h(x)) \qquad 1$$

where:
- a and b are both mission-dependent weighting constants which take into account the types of sensors or weapons with which the entities are equipped;
- g(x) is a value representing the desirability of a grid cell or element x in terms of how safe it is for the bounding vehicle to reach that particular cell; and
- h(x) is a value representing the desirability of a grid cell or element x as an overwatch location once the current bounding entity or vehicle bounds to that location.

The grid cell with the least cost function f(x) is deemed to be the best candidate to be the next overwatch location, and therefore represents the terminus of the current bounding operation.

From block 216 of FIG. 2, the logic flows by way of a logic path 217 to a further block 218, which represents selection of the PBL having the lowest value of f(x) as determined in block 216. This cell corresponds with the cell to which the present bounding entity should travel, and also represents the overwatch location from which the next succeeding bound will be overwatched. From block 218, the logic flows by way of a logic path 25 back to block 26 of FIG. 1.

Figure 4:
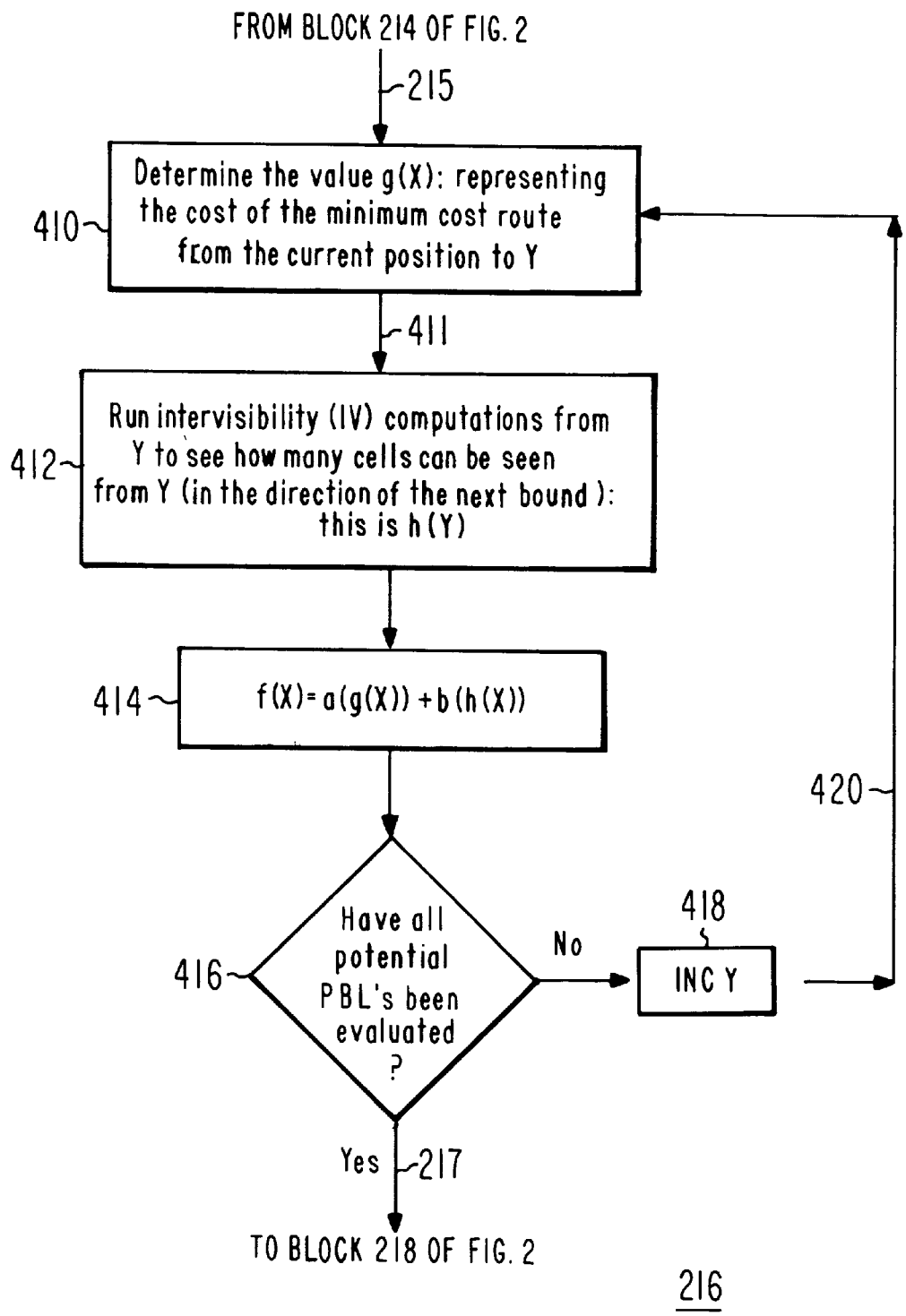
FIG. 4 is a simplified flow chart or diagram illustrating details of a portion of the processing of FIG. 2.

FIG. 4 is a simplified flow chart illustrating the logic operations performed in block 216 of FIG. 2. In FIG. 4, the logic reaches a block 410 by way of logic path 215. Block 410 represents determination of the cost g(x) of the minimum-cost bounding route from the current grid location of the next bounding entity (the next entity to perform the bounding operation) to a grid location Y, where Y corresponds to $Y_1$ or $Y_2$ of FIG. 3, or to any one of the locations Y of the set of all pruned locations. Block 410 of FIG. 4 represents a complete iterative operation, which determines all possible routes, on the "map," between the present location of the bounding entity and the particular one of the pruned cells under consideration during the iteration. In general, the process involved in block 410 involves tracing all possible paths between the present location of the bounding entity and a cell Y, then summing the cost value of each cell which is traversed in each route; in a grid-based environment, the tracing of all possible paths is computationally straightforward and efficient, through the use of standard wave propagation computational techniques found in many route planning algorithms. The route having the lowest cost sum value can then be determined. The result of iterative operation on a single cell in block 410 is a cost function which represents the cost of the minimum-cost route between the current location of the bounding entity and the cell under consideration. This iterative procedure is known in the art, and is described, for example, in the abovementioned U.S. patent application Ser. No. 09/118,838 filed Jul. 20, 1998 in the name of Szczerba [FE-00231], and in [Y. Hwang and N. Ahuja, *Gross Motion Planning—a survey*, published in ACM Computing Surveys, 24 (3): 219–291, September 1992. Thus, the resulting value of g(x) for each grid cell evaluated by block 410 is the sum cost function representing the least costly path between the present location of the bounding entity and the grid cell Y in question (including cell Y). In this context, the term "cost" of a particular grid cell or element is a numerical value used to represent the difficulty (or associated danger) encountered when traversing a particular grid cell. The cost of a route is simply the summation of the individual costs of the grid cells which together comprise the route. Some factors which may enter into the cost determination include terrain elevation, potential of threat exposure, and cultural features (man-made features) such as towns, roads, and the like.

From block 410 of FIG. 4, the logic proceeds to a block 412, which represents determination of h(x), which is a measure of how good a particular grid cell is as an over-watching position when the currently bounding (or next bounding) entity reaches the particular grid cell. Any standard IV algorithm, such as the abovementioned US Army TRADOC Analysis, could be used here, and is run for each of the cells of the set of pruned grid cells, making the assumption that the grid cell under consideration is an overwatching position, and that a new overwatching grid cell location is to be determined. Viewed in another way, the determination of h(x) which is made in block 412 is a determination of how many grid cells can be seen, in the desired or coarse-route direction, from the grid cell x under consideration. That is, the return from block 412 for each value of X is a number which indicates how many other cells can be seen in the desired direction from grid cell X, taking into account the types of available sensors, and incidentally also includes their locations. Essentially, the determination of h(x) involves determining a bounding radius, arc, or the like, for each of the cells, and running the same IV algorithm previously described in relation to FIG. 3. A larger number is conceptually more desirable, as it represents a larger area which can be observed by the new overwatch vehicle. The number of cells which can potentially be bounded to for each grid cell is represented by the number of cells which can be seen from that particular grid cell in the direction of the next bound. The quality of a particular grid cell is represented by the largest number of cells which can be seen from that cell, or in other word, a higher number represents a higher-quality cell for purposes of h(x).

From block 412 of FIG. 4. the logic flows to a further block 414, which determines cost factor f(x) (the least value of which identifies the grid cell which is the best choice for the next overwatch location) from equation (1), using weighting factors a and b which are appropriate to the particular task and capabilities of the entities. Once the value of f(x) is determined for the particular grid cell or x value in block 414, the logic flows to a further decision block 416, which determines if all of the potential PBLs in the pruned set have been evaluated. If they have not all been evaluated, then the logic leaves decision block 416 by the NO output, and reaches a block 418. Block 418 represents incrementing of an index identifying the particular grid cell Y to be evaluated, and the logic returns along a logic path 418 to block 410. The logic loops around the path including blocks 410, 412, 414, 416, 418, and path 420 until all of the grid cells of the set of pruned grid cells have been evaluated for f(x), which as mentioned represents the overall cost of each grid cell as the next overwatch location, and which is therefore identified as being the grid cell which is the terminus or end of the current bounding operation. Eventually, all of the grid cells in the set of pruned candidate grid cells will have been evaluated for f(x), and decision block 416 will then route the logic by its YES output and path 217 back to block 218 of FIG. 2. Since a complete set of values f(x) is now available for the relevant grid cells (the grid cells of the pruned set of grid cells), the grid cell having the minimum value of f(x) is readily identified in block 218. The grid cell having the lowest cost value f(x) is deemed to be the next overwatch location, and consequently is also the terminus of the current or next bounding step.

Figure 5:
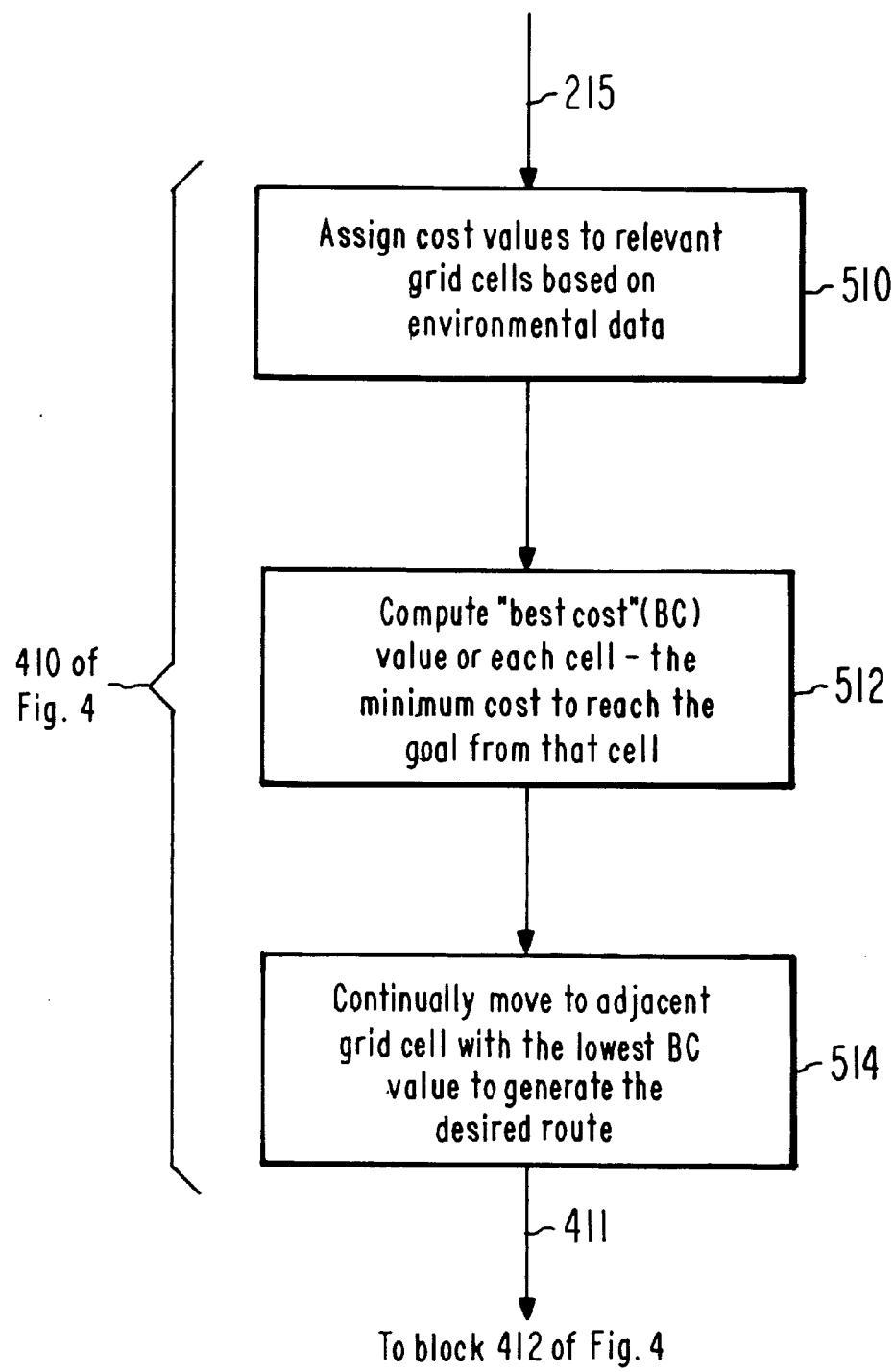
FIG. 5 is a simplified flow chart or diagram illustrating details of a portion of the processing of FIG. 4.

FIG. 5 is a simplified flow chart illustrating one way to perform the logic of block 410 of FIG. 4 to determine cost factor g(x), which is the minimum cost of the costs of all paths by which the bounding entity can reach grid cell x. In FIG. 5, the logic arrives at a block 510 by way of logic path 215. Logic block 510 represents assignment of cost values to the various relevant grid cells based on the environmental data. Block 512 represents determination of the best-cost (BC) value for each cell, which is the minimum cost involved in reaching the cell in question. When the grid cell under consideration is distant from the grid cell in which the bounding entity is presently located, the cost for reaching the cell is the sum of the costs of all cells in the selected path. The minimum total cost for any cell x is the sum of the cell cost plus the sum of the cell costs to reach the next adjacent cell having the lowest sum value.

From block 512 of FIG. 5, the logic flows to a block 514, which represents determination of the minimum-cost route by recurrent movement from a cell to the next adjacent cell having the lowest BC value. The route selected for movement from the current location of the bounding entity to the grid cell selected to be the terminus of the current bounding operation is determined by the grid cells traversed in the route. From block 514, the logic returns to block 412 of FIG. 4 by way of logic path 411.

The operation of logic block 410 can be better understood by reference to FIG. 6a, which is a table which represents Defense Mapping Agency Digital Terrain Mapping Data (DMA DTED), or in other words a digital map broken down into rectangular (preferably square) cells or elements, enriched with DFAD data and any other relevant data, as described above. In FIG. 6a, the rows of the table are lettered A through E, and the columns are numbered 1 through 5. Each element of the table of FIG. 6a is illustrated as a square cell which contains two pieces of information, one in the upper portion of the cell, and the other in the lower portion. The upper number within each cell represents the "map cost" of that particular square. The map cost for a particular cell is a number which represents the estimated relative cost to move through the cell, and depends upon at least the terrain elevation and terrain features, and may also depend upon the presence of known enemy forces or the like. The higher the map cost of a cell, the more costly it is estimated to be to pass through the cell. The lower number in each cell is the "best cost" number, which represents the lowest total cost of reaching the cell in question from the current overwatch position, which in turn is a numeric measure of taking the least-cost path from the current overwatch position to the cell in question, assuming that movement from one cell to another may be from a cell to any one of eight adjacent cells (four of the cells having a side in common with the starting cell, and the other four cells having a corner in common). The best-cost values must be generated for each overwatch position, since they are not associated with any particular cell, but rather with the sum of the map costs of all possible paths lying between a given starting cell and the cell under consideration. In the table, map or array of FIG. 6a, the current overwatch position is taken to be cell A5, which has a map cost (MC) of 14, and a best cost (BC) value of zero. The zero value of BC indicates that there is no cost to traveling to the cell, since one of the entities or vehicles is already there, at cell A5.

In FIG. 6a, taking the present overwatch position as being cell A5, movement can take place to any of three adjacent cells, namely to cells A4, B4, or B5. Cell A4 has a map cost of 12, so the best cost to move directly from cell A5 to cell A4 is 12 units. The map cost value of each of cells B4 and B5 is 15, so the bet cost to move from cell A5 to either cell B4 or B5 is 15 units. Please note particularly that the cost to move to cell A4 from overwatch cell A5 by way of cell B5 is 30 units, which is the sum of the map costs of cells B4 and B5. Similarly, the total cost required to move from cell A5 to cell B4 by way of cell A4 is the sum of map costs 12+15=27. There are therefore three different paths by which travel may occur between cell A5 and cell B4, namely by way of cell A4, directly by way of the diagonal corner, and by way of cell B5. The corresponding sum of the map costs is 27, 15, and 30. Among these three possible costs, the least cost, and therefore the best cost, is 15, achieved by taking the diagonal direct path. Thus, the best-cost value indicated in each cell is predicated upon taking a particular path implicit in the best-cost value indicated in the cell in question.

There will be a multitude of possible alternative paths by which one can arrive at most cells in the map of FIG. 6a, To reach cell A3 from overwatch cell A5, for example, the possible paths and their associated sum costs include

| | |
|---|---|
| (a) A5, A4, A3; | 28 |
| (b) A5, A4, B3, A3; | 303 |
| (c) A5, B5, A4, A3; | 43 |
| (d) A5, B5, B4, A4, A3; | 58 |
| (e) A5, B5, B4, A4, B3, A3; | 333 |
| (f) A5, B4, A4, A3; | 43 |
| (g) A5, B4, A4, B3, A3; | 318 |
| (h) A5, B4, A3; | 31 | as well as many circuitous paths. The least sum among the sums listed above is 28, and by simple examination of the map of FIG. 6a indicates that it is unlikely that any other possible path would have a lower sum. While evaluation of movement between semi-adjacent cells as in movement between cells A5 and A3 in the example is fairly straightforward, if tedious, the problem becomes more complex when large numbers of possible paths exist between the overwatch cell and a target cell.

FIG. 6b is similar to FIG. 6a, but has the cells associated with a particular path selection circled for identification. In FIG. 6b, the goal or task is assumed to be to reach a particular cell, taking in this example as reaching cell E1 from cell A5. To determine the most efficient path, one traces back from the goal cell to the next adjacent cell which as the smaller bc value. More particularly, looking from cell E1, the adjacent cells are D1, D2, and E2. The bc values of these adjacent cells are 199, 403, and 222, respectively. Among these values, the least value is that of cell D1, with a value of 199. Consequently, the most desirable path by which the goal cell E1 can be reached from cell A5 includes cell D1, rather than either cells D2 or E2. Cell D1 is circled in FIG. 6b to indicate its inclusion in the most desirable path between cell A5 and cell E1. From cell D1, the next step is to look toward the next adjacent cells, which are C1, C2, D2, and E2. For computational simplicity, one may also wish to look to the previous cell in the path, which in this case is cell E1, but it will always have a larger bc value than another cell. If desired, cells already traversed or rejected may be disregarded in the computation. Among the values 358, 167, 403, and 222 for the cells adjacent to cell D1, the least value is 167, which is the value of cell C2. Cell C2 is circled in FIG. 6b to indicate its inclusion in the most desirable path between cell A5 and cell E1. The process is repeated for cell C2; the values of the adjacent cells are 358, 122, 300, 287, 225, 327, 403, and 199, among which the value of 122 is least, thereby identifying cell B1 as the next cell in the "reverse" path identification. Similarly, from cell B1, the lowest value of the adjacent cells is 38, of cell A2. The process continues, identifying in sequence cells A3 and A4 to reach A5.

A more difficult problem is that presented when there is no clearly defined target cell, but rather there is a target region. In the map or table of FIG. 6a, assume that the new overwatch position which is the goal may be any cell within rows D or E. Determination of a path involves calculation of the best cost between cell A5 and each cell of the set of cells in rows D and E, and then selecting that one of the cells which has the lowest cost. In the example of FIG. 6a, the best cost (BC) values for cells within the target region range from 199 to 403. In this particular case, cell D1, having the least BC of 199, is selected as the target cell, and the path which provided that lowest cost is the selected path.

The examples do not represent the most complex type of problem related to path selection. There may be extrinsic constraints which are placed on the path which make the problem more complex. Such constraints might include a maximum route length, maximum turning angle, or the like. These additional constraints can be handled by application of weighting factors to the calculations, as is described in the Szczerba application.

Figure 7:
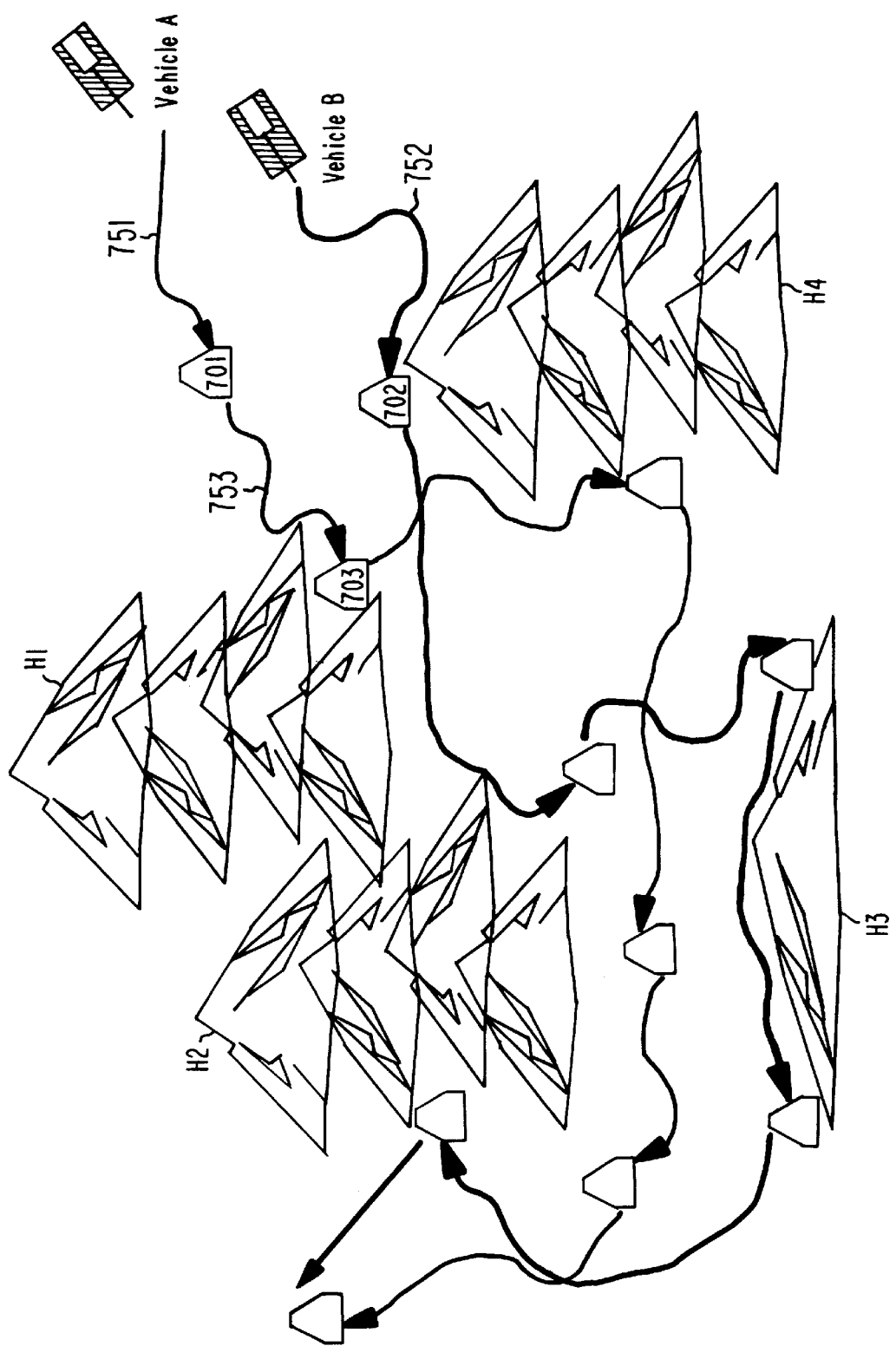
FIG. 7 is a simplified map representing paths which may be taken by overwatch and bounding vehicles.

FIG. 7 is a simplified map representing paths which may be taken by bounding overwatch and bounding vehicles through particular terrain. In FIG. 7, vehicles A and B are identified, and the coarse route is a path between the illustrated hill groups H1, H2, H3, and H4. Within the coarse path, The location designated 701 represents the location of vehicle A after its first bounding operation, which is designated 751. During the first bounding of vehicle A, vehicle B remains at the illustrated location. Path 752 represents the path taken by vehicle B as a bounding vehicle to reach location 702, while vehicle A remains on overwatch at location 701. After vehicle B reaches location 702, vehicle A becomes the bounding vehicle, and vehicle B the overwatch vehicle at location 702. Vehicle A bounds from location 701 to location 703 along path 753. When vehicle A reaches location 703, it stops, and provides overwatch for vehicle B; vehicle B then bounds to he next location. The procedure continues, with vehicles A and B alternating the bounding and overwatch functions, as suggested by the dash-line paths.

Other embodiments of the invention will be apparent to those skilled in the art. For example, while the team has been described as including two entities, it may include a plurality of entities, so long as there are at least two entities which can be moved independently of each other. Each entity of the team may consist of a plurality of men, vehicles, weapons, or the like. While the number of pruned PBLs has been described as two in FIG. 3, the number of cells remaining after the pruning step of block 214 may be any number.

Thus, a computer method (10) according to an aspect of the invention, is for determining the routes of at least first and second entities, which operates as a team, toward an objective location or region (in the direction of arrow 318) in a threat environment. The threat environment has topological features (312, 314, 316) which aid in concealment and in providing vantage points for observation. The method (10) includes the step (16) of obtaining a data representation of the environment in a region which includes the present locations (A, B) of the first and second entities, and which also includes a particular objective location in the environment. The data representation should include any known threats lying within the environment. A coarse route is selected through the environment, as by a human operator. The data representing the coarse route is read (18). Data relating to some characteristics of the first and second entities is obtained (20). This data may include such matters as the types of communication devices and weapons with which each entity is fitted, which are surrogates for the information which is actually required, which is the range and other characteristics of the communication system, and the range and accuracy of their various weapons. According to an aspect of the invention, one (B) of the first (A) and second (B) entities is designated to be the bounding entity, and the other one (A) of the first (A) and second (B) entities to be the overwatching entity. The computer program (10) determines (24) the next overwatch location ($Y_1$), and determines the route (350) which the bounding entity (B) should take to the next overwatch location ($Y_1$). Movement of the bounding entity toward the next overwatch location is then commanded or suggested (28). If the overwatch location ($Y_1$) is not the location of the objective (in the direction of arrow 318), the other one (A) of the first (A) and second (B) entities is redesignated (30) to be the bounding entity and the one (B) of the first (A) and second (B) entities to be the overwatching entity. The procedure is partially repeated (22, 24, 26, 28, 30, 32) until the objective is reached or the objective is changed, by repeating the steps of determining the next overwatch location, determining the route, commanding the movement, and redesignating.

What is claimed is:

1. A computer method for determining the routes of at least first and second entities, operating as a team, toward an objective location in a threat environment having topological features, said method comprising the steps of:

obtaining a data representation of the environment in a region including the present location of said first and second entities, and including a particular objective location in said environment, said data representation including any threats lying within said environment;

reading a selected initial coarse route through said environment;

obtaining data relating to some characteristics of said first and second entities;

designation of one of said first and second entities to be the bounding entity, and the other one of said first and second entities to be the overwatching entity;

determining the next overwatch location;

determining the route of said bounding entity to said next overwatch location;

commanding the movement of said bounding entity to said overwatch location;

if said overwatch location is not said objective location, redesignating said one of said first and second entities to be said bounding entity and the other one of said first and second entities to be the overwatch entity; and repeating said steps of determining the next overwatch location, determining the route, commanding the movement, and redesignating until said objective location is reached.

2. A method according to claim 1, wherein said step of obtaining data relating to some characteristics of said first and second entities includes the obtaining of information relating to at least one of (a) the range of the communications devices with which said first and second entities are fitted and (b) the maximum effective range of their relevant respective weapons.

* * * * *